United States Patent [19]
Yoshioka et al.

[11] Patent Number: 5,383,531
[45] Date of Patent: Jan. 24, 1995

[54] TURN CONTROL SYSTEM FOR A FOUR WHEEL DRIVE VEHICLE

[75] Inventors: Hidetaka Yoshioka; Fumio Takada, both of Sakai, Japan

[73] Assignee: Kubota Corporation, Osaka, Japan

[21] Appl. No.: 76,264

[22] Filed: Jun. 11, 1993

Related U.S. Application Data

[63] Continuation of Ser. No. 673,274, Mar. 21, 1991, abandoned.

[51] Int. Cl.⁶ ............................................. B60K 17/34
[52] U.S. Cl. .................... 180/233; 180/249; 280/95.1
[58] Field of Search ............... 180/233, 244, 248, 249; 364/424.05; 280/772, 95.1

[56] References Cited

U.S. PATENT DOCUMENTS

| | | | |
|---|---|---|---|
| 3,059,944 | 10/1962 | Goodacre | 280/95.1 |
| 4,669,559 | 6/1987 | Fukui | 180/624 |
| 4,696,365 | 9/1987 | Ishimori et al. | 180/233 |
| 4,723,622 | 2/1988 | Toshikuni et al. | 180/233 |
| 4,856,611 | 8/1989 | Teraoka et al. | 180/233 |

FOREIGN PATENT DOCUMENTS

| | | |
|---|---|---|
| 3633399 | 9/1987 | Germany . |
| 34229 | 2/1988 | Japan . |
| 287630 | 11/1988 | Japan . |
| 2190049 | 11/1987 | United Kingdom . |

OTHER PUBLICATIONS

French Patent Office Search Report.

*Primary Examiner*—Kenneth R. Rice
*Assistant Examiner*—Anne Marie Boehler
*Attorney, Agent, or Firm*—Webb Ziesenheim Bruening Logsdon Orkin & Hanson

[57] ABSTRACT

A turn control system for a four wheel drive vehicle which includes an accelerating transmission for driving the right and left steerable wheels at a greater average velocity than the right and left non-steerable wheels. A steering device and a switching device are interlocked such that a change speed device is operable in the accelerating transmission when the steerable wheels are steered in excess of a predetermined angle. An inner one of the steerable wheels with respect to a turning circle has a maximum steering angle $\beta 1$ which is set to form the following expression:

$$\mathrm{secant}\ \beta 1 > K$$

where K is a ratio of the greater average peripheral velocity of the right and left steerable wheels when driven by the accelerating transmission with respect to the peripheral velocity of the right and left non-steerable wheels.

3 Claims, 7 Drawing Sheets

5,383,531

TURN CONTROL SYSTEM FOR A FOUR WHEEL DRIVE VEHICLE

This is a continuation of copending application Ser. No. 07/673,274 filed on Mar. 21, 1991, now abandoned.

BACKGROUND OF THE INVENTION

1. Field of the Invention

The present invention relates to a turn control system for a four wheel drive vehicle, particularly an earth working vehicle such as a tractor.

2. Description of the Related Art

To promote operating efficiency of the earth working vehicle in repeating U-turns during an operation, it is important to minimize a space required when the vehicle changes its running directions. Japanese Patent Publication Kokai No. 1988-34229 and U.S. Pat. No. 4,723,622 disclose four wheel drive vehicles capable of making such small, sharp turns. These vehicles comprise;

an engine,
right and left non-steerable wheels for receiving drive of the engine through a differential device,
right and left steerable wheels for receiving the drive of the engine through a further differential device,
a steering device for controlling the steerable wheels,
a change speed device connected to the steerable wheels, the change speed device including a standard transmission mode for driving the right and left steerable wheels at substantially the same average peripheral velocity as the right and left non-steerable wheels, an accelerating transmission mode for driving the right and left steerable wheels at a greater average peripheral velocity than the right and left non-steerable wheels, and switching device for selecting between the standard transmission mode and the accelerating transmission mode, and
an interlocking device for interlocking the steering device and the switching device such that the change speed device is operable in the accelerating transmission mode when the steerable wheels are steered in excess of a predetermined angle.

This type of four wheel drive vehicle in practical use today employs a steering specification for the four wheel drive tractor which has been widely used in the past. As described in Japanese Patent Publication Kokai No. 1988-34229 mentioned above and in U.S. Pat. No. 4,696,365, its maximum steering angle is set to about 55 degrees. With such a steering specification, a side force is generated, when the vehicle makes a turn, to push front wheels, which are the steerable wheels, outwardly with respect to the turning circle since the front wheels are accelerated then. This results in an increased resistance to running of the vehicle, or leaves marred patches of ground.

Further, as is known from Japanese Patent Publication Kokai No. 1988-287630 and U.S. Pat. No. 4,669,559, an inner one of the rear wheels with respect to a turning circle is locked by a side brake besides accelerating the front wheels in order to make the turning circle smaller. This is a forced turn, though a small turn it may be, which is injurious to the ground and causes a considerable loss of power.

SUMMARY OF THE INVENTION

An object of the present invention is to provide an improvement on the state of the art noted above. More particularly, the present invention intends to provide a turn control system which correlates the accelerating ratio of steerable wheels with respect to non-steerable wheels and the steering specification in a conventional four wheel drive wheel, thereby allowing the vehicle to make a small turn smoothly and reliably without damaging the ground.

The above object is fulfilled, according to the present invention, by a concept that breaks away from the common sense relating to the four wheel drive vehicle, in which an optimal maximum steering angle of steerable wheels is set to the accelerating ratio of the steerable wheels with respect to the non-steerable wheels.

In one aspect of the invention, an inner one of the steerable wheels with respect to a turning circle has a maximum steering angle: $\beta 1$ set to form the following expression:

$$\text{secant } \beta 1 > K$$

where K is an accelerating ratio of the accelerating transmission mode with respect to the standard transmission mode of the change speed device.

In another aspect of the invention, the steerable wheels have maximum steering angles: $\beta 1$ and $\beta 2$ whose average $\beta$ is set to form the following expression:

$$\text{secant } \beta \approx K$$

where K is an accelerating ratio of the accelerating transmission mode with respect to the standard transmission mode of the change speed device. In this case, the maximum steering angles: $\beta 1$ and $\beta 2$ are set approximately the same as theoretical maximum steering angles: $\beta 01$ and $\beta 02$, respectively, for causing the right and left steerable wheels driven in the accelerating transmission mode to revolve about a center of turning: O lying on an extension line from an axis of the right and left non-steerable wheels.

The principle of the solution according to the present invention as noted above will be described with reference to FIG. 1 showing an example of turns made by a four wheel drive vehicle having steerable front wheels and non-steerable rear wheels. An ideal turning state of the vehicle is assumed here, in which front wheels 1 and rear wheels 2 are both driven, without slips or skids, about a center of turning O lying on an extension from the axles of the rear wheels. An average peripheral speed of the right and left front wheels 1, i.e. a velocity of movement in a tangential direction of the mid-point A between the right and left front wheels 1, and an average peripheral speed, i.e. a velocity of movement in a tangential direction of the mid-point B between the right and left rear wheels 2, are in a relationship V1/V2=OA/OB. It is clear that V1/V2 corresponds to the ratio of the average peripheral speed of the front wheels with respect to the average peripheral speed of the rear wheels, i.e. an accelerating ratio: K of the front wheels with respect to the rear wheels.

As seen from the FIG. 1, the mid-point A between the right and left front wheels 1 forms an angle $\alpha$ in the moving direction with the centerline of the vehicle, which is equal to <AOB. Thus, the secant of the angle $\alpha$ is expressed by the equation sec$\alpha$=OA/OB=V1/V2.

The steering angle $\beta 01$ of the left front wheel 1 lying inwardly with respect to the turning circle and the steering angle $\beta 02$ of the right front wheel 1 lying outwardly, when steered in an ideal manner, are expressed as $\beta 01 > \alpha$ and $\beta 02 < \alpha$. If the average $\beta 0$ of the two steering angles $\beta 01$ and $\beta 02$ is approximated as $\beta 0 = \alpha$, the following relations are established:

$$\sec\beta 0 = \sec\alpha = V1/V2$$

$$\sec\beta 01 > V1/V2 (= \sec\beta 0)$$

In securing turns as close as an ideal turn, therefore, it is important to set a maximum steering angle $\beta 01$ of the front wheel 1 lying inwardly with respect to the turning circle to be greater than the accelerating ratio $V1/V2$ of the front wheels. Incidentally, the front wheel 1 lying outwardly has a maximum steering angle $\beta 02$ expressed as follows:

$$\sec\beta 02 < V1/V2 (= \sec\beta 0)$$

If the accelerating ratio $V1/V2$ of the front wheel 1 is set to 2.0, then;

$$\sec\alpha (= \sec\beta 0) = 2.0,\ \alpha (= \beta 0) = 60°$$

$$\sec\beta 01 > 2.0,\ \beta 01 > 60°$$

Specific values of $\beta 01$ and $\beta 02$ are derived from the following equations:

$$\beta 01 = \alpha + \gamma 1$$

where $$\tan\gamma 1 = \frac{(W/2)\cdot \sin\alpha}{(L/\sin\alpha) - ((W/2)\cos\alpha)}$$

Therefore, $$\gamma 1 = \tan^{-1}\left[\frac{W}{2}\sin\alpha / \left(\frac{L}{\sin\alpha} - \frac{W}{2}\cos\alpha\right)\right]$$

$$\beta 02 = \alpha + \gamma 2$$

where $$\tan\gamma 2 = \frac{(W/2)\sin\alpha}{(L/\sin\alpha) + ((W/2)\cos\alpha)}$$

Therefore, $$\gamma 2 = \tan^{-1}\left[\frac{W}{2}\sin\alpha / \left(\frac{L}{\sin\alpha} + \frac{W}{2}\cos\alpha\right)\right]$$

In the above equations, W is the tread of the front wheels 1, and L is a wheelbase.

In an actual vehicle specification, the maximum steering angle $\beta 01$ in theory of the front wheel 1 lying inwardly with respect to a circle of turning is on the order of 70 degrees. It is difficult in practice to realize such a steering angle by reason of the steering mechanism. As seen from FIG. 2 showing a way a turn is made in an embodiment of the present invention, an actual steering angle $\beta 1$ takes a slightly smaller value than the theoretical maximum steering angle $\beta 01$. However, nearly ideal turns are realized by setting the maximum steering angle $\beta 2$ of the outer front wheel to a value slightly greater than the theoretical value, and setting the average $\beta$ of the steering angles of the inner and outer front wheels such that $\sec\beta$ is approximately the same as the accelerating ratio: K.

While the way a turn is made in the embodiment of the invention will be described later, the accelerating ratio of the change speed device for the steerable wheels and the maximum steering angles of the right and left steerable wheels are correlated and set rationally in the turn control system according to the present invention. This system allows the vehicle to make a turn smoothly and reliably with a small radius and with little resistance, without applying a side brake to the non-steerable wheel lying inwardly with respect to a circle of turning. In making such a turn, no side force is generated with the steerable wheels, and no damage is done to the ground by the steerable wheels or non-steerable wheels.

Where damage to the ground makes no matter, an ultra-small turn may be made with a small radius by using a side brake as well. Further, depending on ground conditions, a side brake may be used moderately to enable a sufficiently small turn with little damage done to the ground. Thus, the invention provides a turn control system having a greatly improved performance over the same type of system known in the art.

Other objects and features of this invention will be understood from the following description made with reference to the accompanying drawings.

DETAILED DESCRIPTION OF THE PREFERRED EMBODIMENT

A tractor, which is an example of four wheel drive working vehicles and to which the present invention is applied, will be described hereinafter with reference to the drawings.

Figure 3:
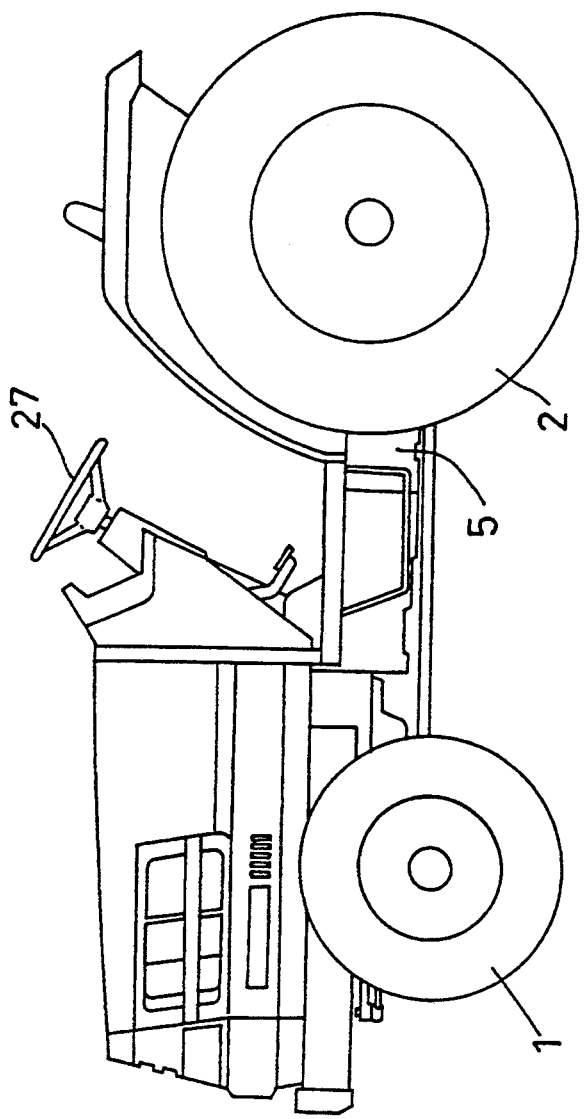
FIG. 3 is a side view of a four wheel drive tractor employing the turn control system according to the present invention.
Figure 4:
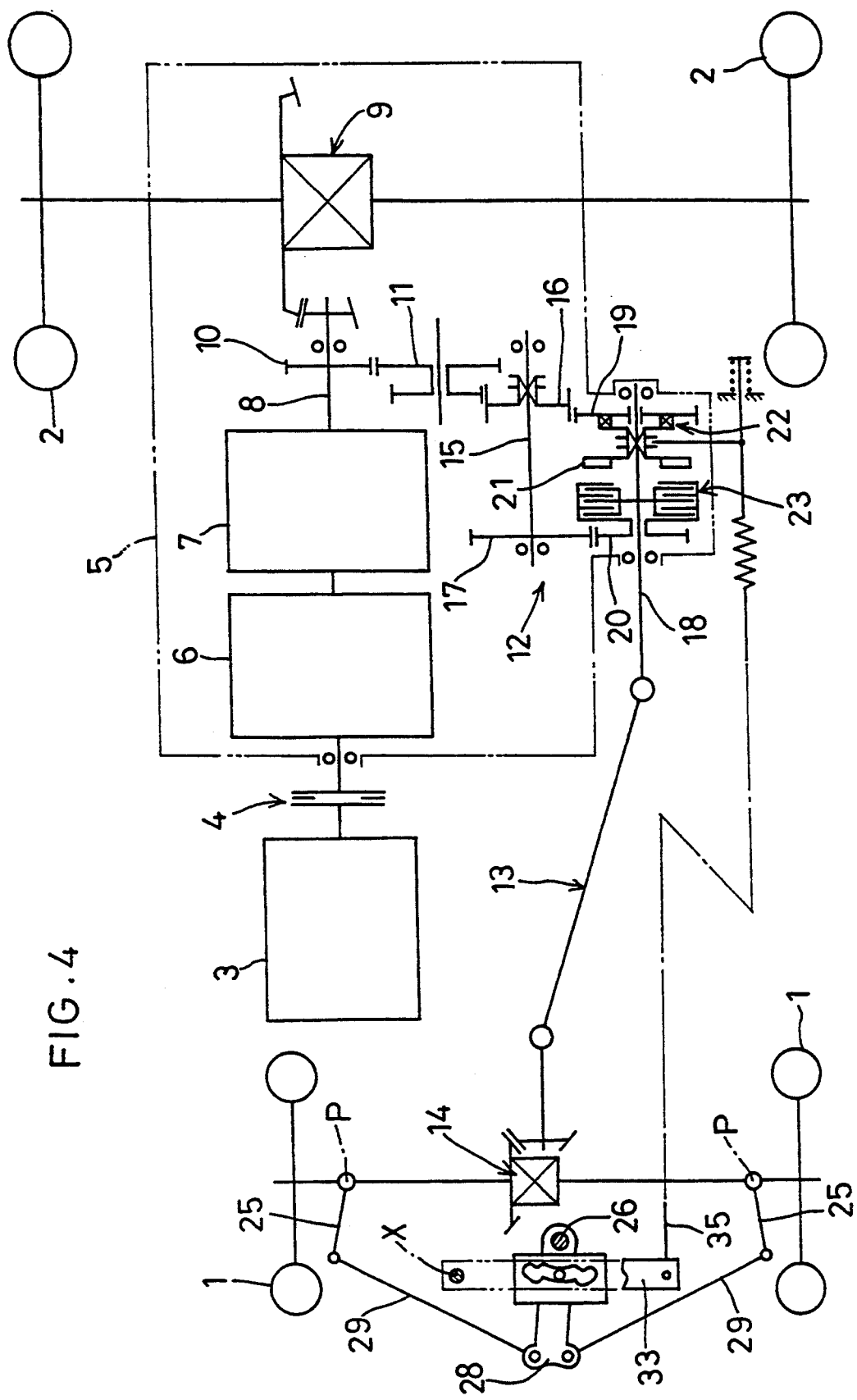
FIG. 4 is a diagram of a propelling transmission system.

FIG. 3 shows a side elevation of a four wheel drive agricultural tractor having steerable front wheels 1 and non-steerable rear wheels 2. FIG. 4 schematically shows a transmission system for driving the front wheels 1 and rear wheels 2.

As shown in FIG. 4, output of an engine 3 mounted in a front portion of a tractor body is transmitted through a main clutch 4 to a transmission case 5 mounted in a rear portion of the tractor body. The transmission case 5 contains a main change speed gearing 6 and an auxiliary change speed gearing 7 for changing the speed of the engine output. The output is then transmitted to a bevel pinion shaft 8 which is a final change speed shaft, and distributed through a rear differential 9 to the right and left rear wheels 2.

The bevel pinion shaft 8 carries a gear 10 fixed thereto, from which the engine output is taken out and transmitted through an intermediate two-step gear 11 to a front wheel (steerable wheel) change speed device 12. Output of this change speed device 12 is transmitted through a shaft transmission mechanism 13 to a front differential 14 for distribution to the right and left front wheels 1.

Figure 5:
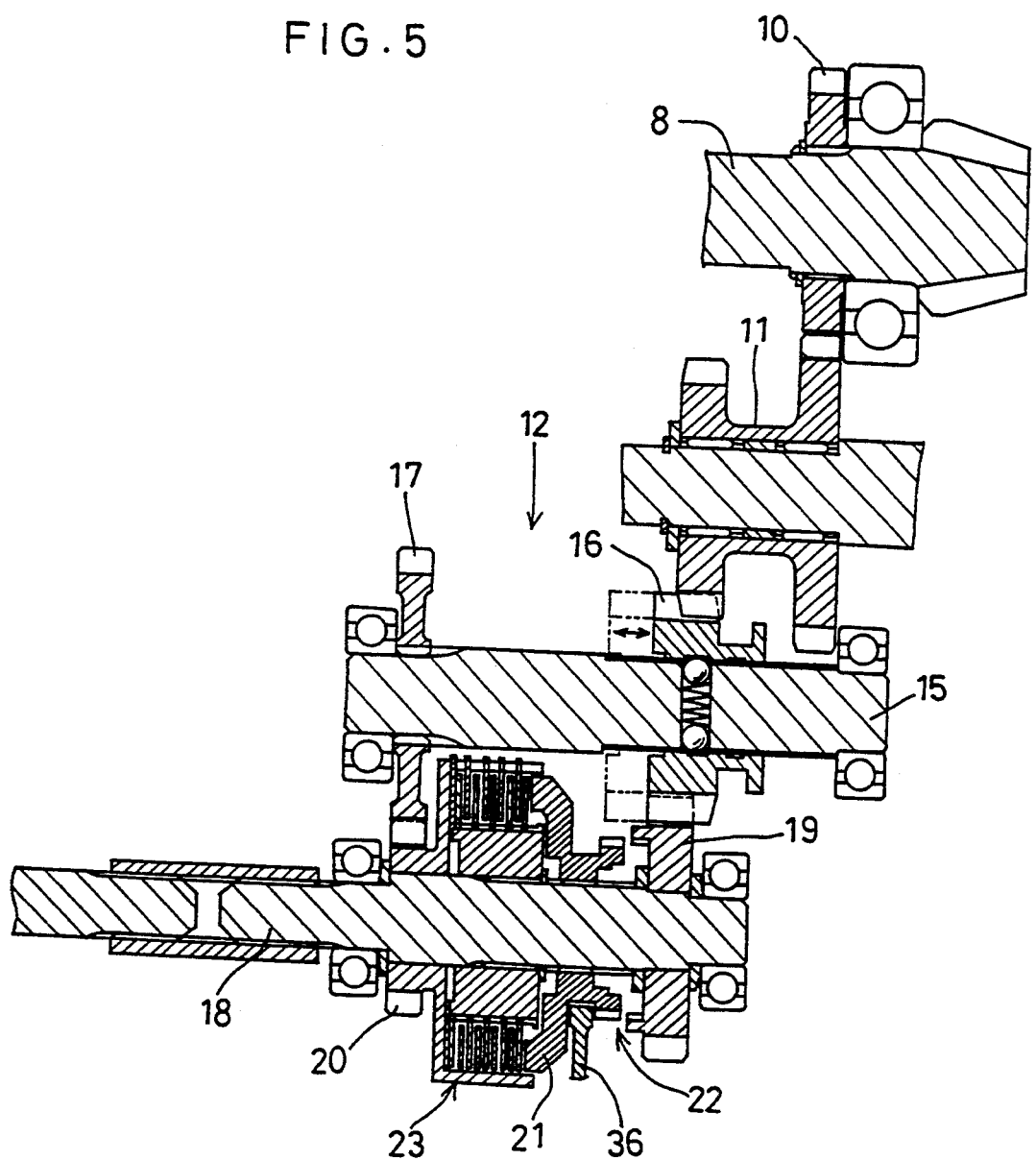
FIG. 5 is a side view in vertical section of a change speed device for steerable wheels.
Figure 6:
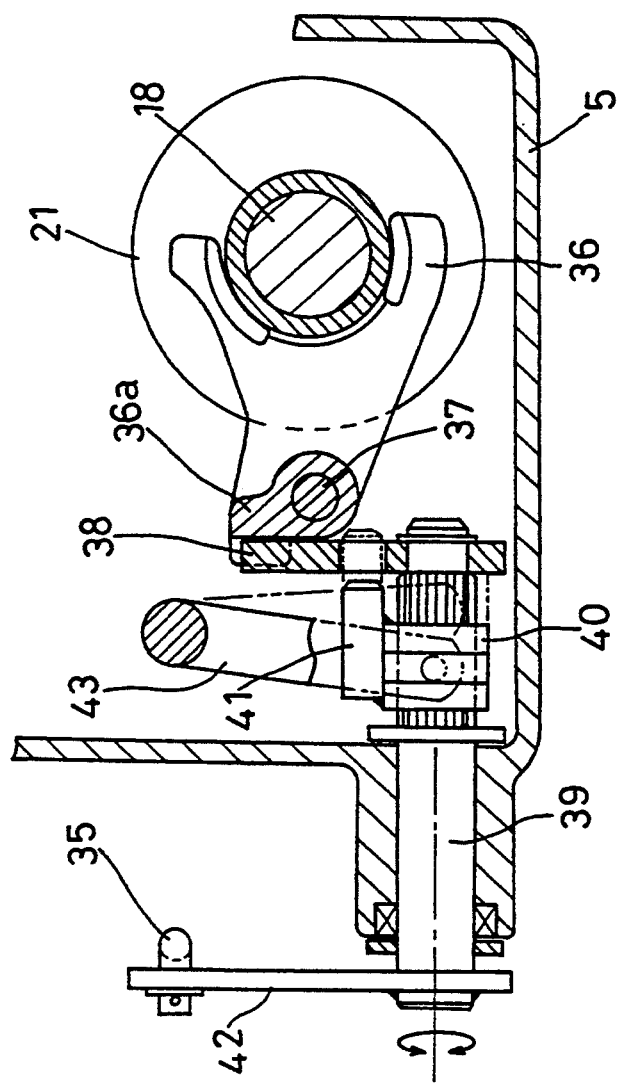
FIG. 6 is a rear view in vertical section of the device shown in FIG. 5.

FIGS. 5 and 6 show details of the front wheel change speed device 12. The change speed device 12 includes an input shaft 15 carrying an input gear 16 splined thereto to be shiftable into and out of engagement with the intermediate two-step gear 11, and a large accelerating gear 17 fixed to the input shaft 15. The change speed device 12 further includes an output shaft 18 carrying a first change speed gear 19 and a second change speed gear 20 freely rotatably mounted thereon. The first change speed gear 19 is in constant mesh with the input gear 16, and the second change speed gear 20 in constant mesh with the accelerating gear 17. A clutch member 21 is shiftably splined to the output shaft 18 between the gears 19 and 20.

A claw clutch 22 is provided between the clutch member 21 and first change speed gear 19, which is operable with shifting of the clutch member 21. The second change speed gear 20 is formed integral with a driving end of a multidisk type friction clutch 23 mounted on the output shaft 18. The clutch member 21 acts as a pressing control member for operating the friction clutch 23.

More particularly, the claw clutch 22 is engaged when the clutch member 21 is shifted rightward in FIG. 5. Then, drive is transmitted from the input shaft 15 to the output shaft 18 at a speed determined by a gear ratio between the input gear 16 and first change speed gear 19. When the clutch member 21 is shifted leftward in FIG. 5, the friction clutch 23 is engaged, whereby the drive is transmitted from the input shaft 15 to the output shaft 18 at a speed determined by a gear ratio between the accelerating gear 17 and second change speed gear 20.

When the output shaft 18 is driven at low speed with the claw clutch 22 engaged, the right and left front wheels 1 are driven at an average peripheral velocity equal to or slightly faster than that of the right and left rear wheels 2. This state is a standard transmission state. When the output shaft 18 is driven at high speed with the friction clutch 23 engaged, the gear ratio is set such that the front wheels 1 are accelerated to about twice the velocity of the standard transmission state. Therefore, in the accelerating mode, the right and left front wheels are driven at an average peripheral velocity approximately twice the average peripheral velocity of the right and left rear wheels. This accelerating transmission state is automatically produced when the front wheels 1 are steered in excess of a predetermined angle. A control structure relating to this aspect will be described next.

Figure 7:
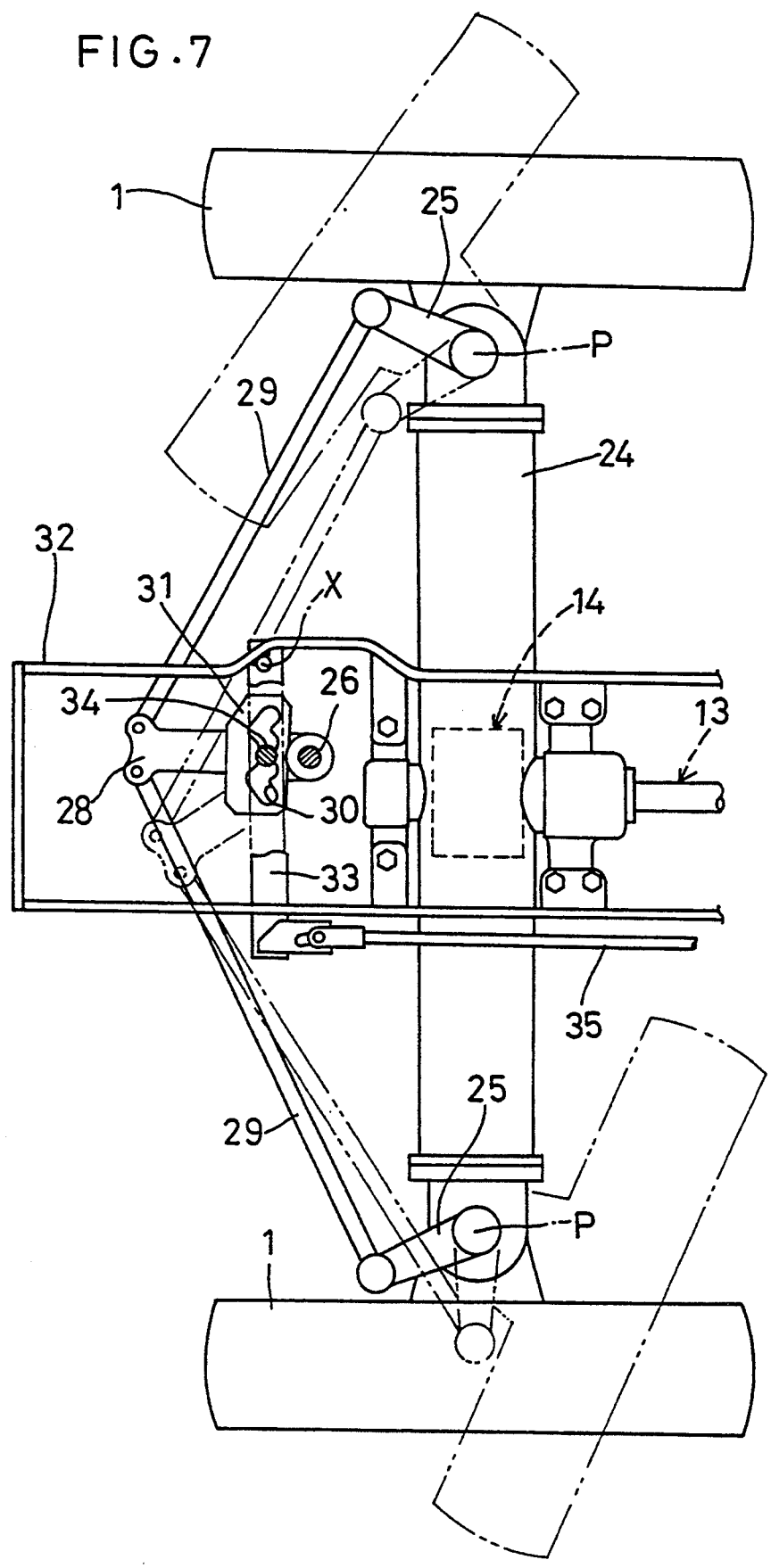
FIG. 7 is a plan view of a steering mechanism.

FIG. 7 shows a plan view of a front wheel steering mechanism. The front differential 14 is mounted in a front axle case 24 supporting, at opposite ends thereof, knuckle arms 25 of the right and left front wheels 1 which are pivotable about kingpin axes P. The respective knuckle arms 25 are operatively connected through tie rods 29 to a forward end of a pitman arm 28 interlocked to a steering wheel 27 to be swingable right and left about a pivotal axis 26 disposed in the front portion of the tractor body.

The pitman arm 28 carries a cam plate 31 fixed to a longitudinally intermediate position thereof and defining a cam groove 30. A swing arm 33 is pivotally connected to a body frame 32 to be swingable in fore and aft directions about a pivotal point X. The swing arm 33 carries a cam follower pin 34 disposed at an intermediate position thereof. Thus, the swing arm 33 is swingable fore and aft with sideways swings of the pitman arm 28.

The cam groove 30 is shaped such that the swing arm 33 is not swung while the pitman arm 28 is swung right or left through an angle less than a predetermined angle (about 40 degrees), but is forcibly swung forward when the pitman arm 28 is swung through the predetermined angle or more.

A control rod 35 extends from a free end of the swing arm 33 to be interlocked to the clutch member 21 of the front wheel change speed device 12 as follows.

As shown in FIG. 6, a shift fork 36 is slidably supported on a stationary support shaft 37 for shifting the clutch member 21. The shift fork 36 includes a boss portion 36a engageable with a control arm 38 loosely fitted on an inward end of a speed control shaft 39. The speed control shaft 39 carries a collar 40 splined thereto and having a pin 41 engageable with the control arm 38 to interconnect the speed control shaft 39 and control arm 38. The speed control shaft 39 further carries an arm 42 fixed to an outward end thereof, and the control rod 35 is connected at a rear end thereof to the arm 42.

The front wheels are driven in the low-speed, standard transmission state with the claw clutch 22 engaged while the front wheels 1 are steered through angles less than the predetermined steering angle. When the front wheels 1 are steered in excess of the predetermined steering angle, the friction clutch 23 is engaged to drive the front wheels 1 in the accelerating transmission state.

The collar 40 is operable through a shift fork 43 from outside to maintain the pin 41 out of engagement with the control arm 38 as illustrated. Then, the clutch member 21 is spring-loaded to the position to engage the claw clutch 22, whereby the front wheels 1 are driven in the standard transmission state regardless of the steering angle thereof.

Further, the input gear 16 is shiftable out of engagement with the intermediate two-step gear 11. This breaks the drive input to the front wheel change speed device 12, whereby only the rear wheels 2 are used to propel the tractor.

Figure 1:
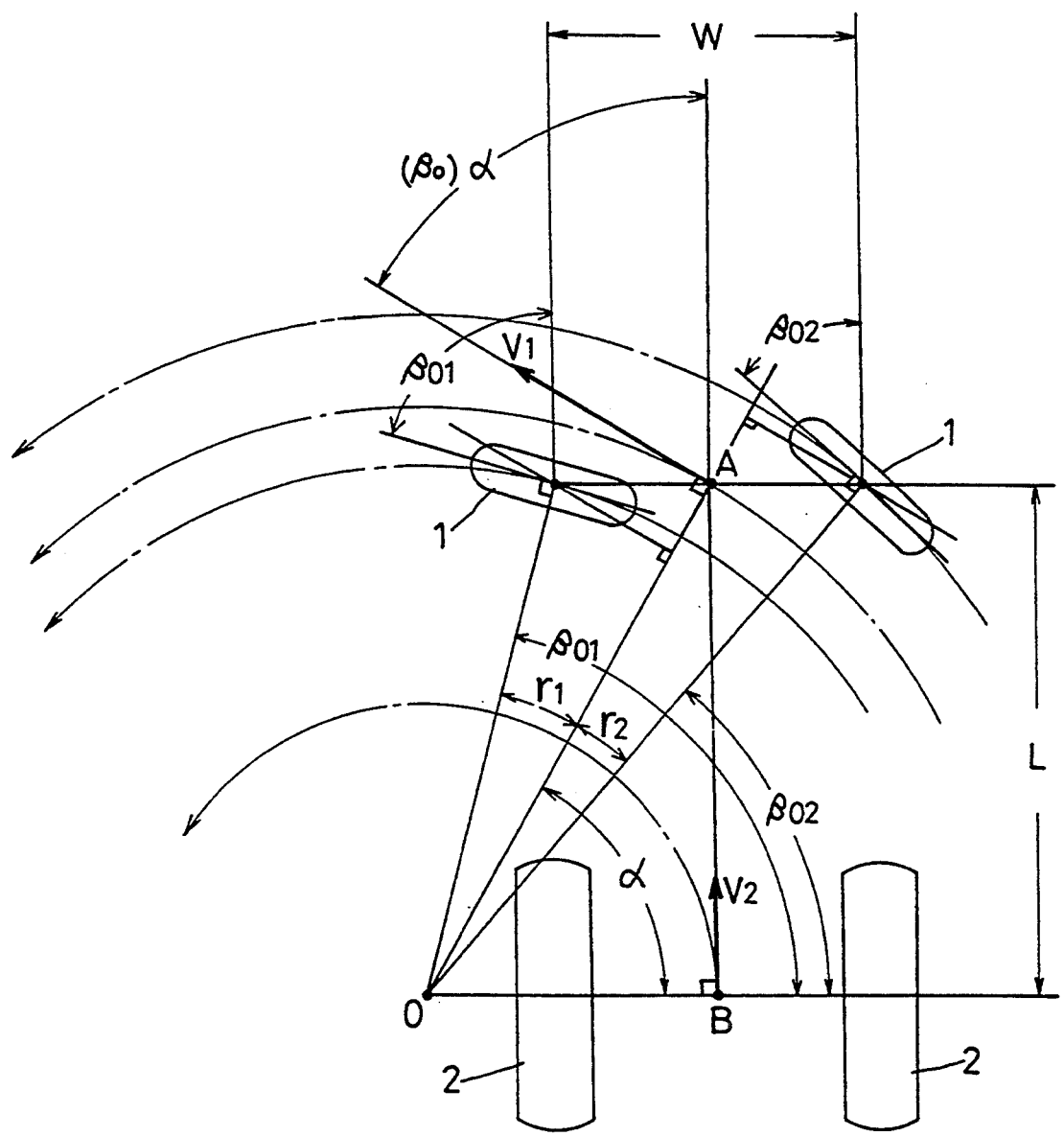
FIG. 1 is a schematic view showing an ideal state of the smallest turn made by a four wheel drive vehicle of the front wheel acceleration type.
Figure 2:
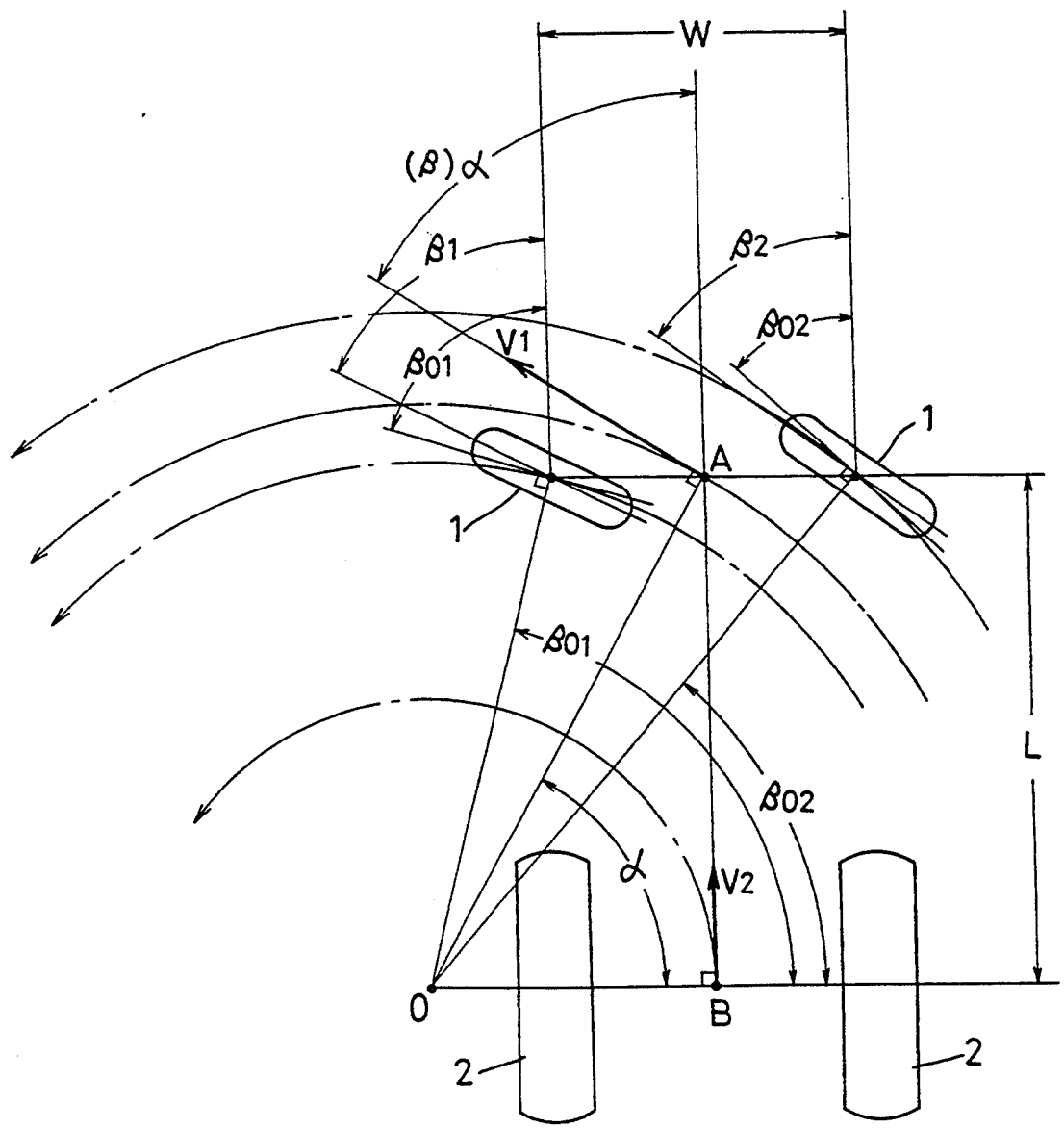
FIG. 2 is a schematic view showing the smallest turn made by a four wheel drive vehicle employing a turn control system according to the present invention.

FIG. 2 shows a way in which a turn takes place by the turn control system embodying the present invention. In this example, the front wheel 1 inwardly with respect to a turning circle has a maximum steering angle ($\beta 1$) at 63 to 65 degrees, and the outward front wheel 1 a maximum steering angle ($\beta 2$) of about 55 degrees, with an average steering angle ($\beta$) of about 60 degrees. The accelerating transmission state has an accelerating ratio of 1.8 to 2.0 with respect to the standard transmission state of the front wheel change speed device 12.

The maximum steering angles $\beta 1$ and $\beta 2$ and front wheel accelerating ratio are set as above in the tractor having a wheelbase L of 1550 to 1750 mm and a front wheel tread W of 950 to 1580 mm. This invention allows the tractor to make a small turn in the accelerating transmission state without applying a side brake to the rear wheel inwardly with respect to the turning circle, with a minimum turning radius comparable to that of the conventional vehicle which makes a turn in the accelerating transmission state by applying the side brake and completely locking the rear wheel inwardly with respect to the turning circle.

The foregoing embodiment has been described as having steerable front wheels and non-steerable rear wheels. However, the present invention is applicable also to a four wheel drive vehicle, such as a front mount type lawn mower, which has non-steerable front wheels and steerable rear wheels.

What is claimed is:

1. A turn control system for a four wheel drive vehicle comprising:

an engine;
   right and left non-steerable wheels for receiving a drive of said engine through a differential device;
   right and left steerable wheels for receiving said drive of said engine through a second differential device;
   steering means for controlling said steerable wheels;
   change speed means connected to said steerable wheels, said change speed means including a standard transmission mode for driving said right and left steerable wheels at substantially the same average peripheral velocity as said right and left non-steerable wheels, an accelerating transmission mode for driving said right and left steerable wheels at a greater average peripheral velocity than said right and left non-steerable wheels, and switching means for selecting between said standard transmission mode and said accelerating transmission mode; and
   interlocking means for interlocking said steering means and said switching means such that said change speed means is operable in said accelerating transmission mode when said steerable wheels are steered in excess of a predetermined angle,
   wherein an inner one of said steerable wheels with respect to a turning circle has a maximum steering angle $\beta 1$ set to form the following expression:

$$\text{secant } \beta 1 > K$$

where K is an accelerating ratio of said greater average peripheral velocity of said right and left steerable wheels in said accelerating transmission mode with respect to said average peripheral velocity of said right and left non-steerable wheels, wherein said accelerating ratio K is approximately 2 and wherein said maximum steering angle $\beta 1$ of said inner one of said steerable wheels is set within the range of 63 to 65 degrees;
   wherein said maximum steering angle $\beta 1$ is set less than a theoretical maximum steering angle $\beta 01$ of said inner wheel for an ideal turn, wherein said theoretical maximum steering angle $\beta 01$ is derived from the following equation:

$$\beta 01 = \alpha + \gamma 1$$

where $$\tan \gamma 1 = \frac{(W/2) \sin \alpha}{(L/\sin \alpha) - ((W/2) \cos \alpha)}$$

where W is the tread of the right and left steerable wheels, L, is a wheelbase of said vehicle, and $\alpha$ is an angle formed at the mid-point between said right and left steerable wheels formed between the moving direction of said vehicle and the centerline of said vehicle during said ideal turn.

2. A turn control system as claimed in claim 1, wherein said steerable wheels are front wheels, and said non-steerable wheels are rear wheels.

3. A turn control system for a four wheel drive vehicle comprising:

an engine;
   right and left non-steerable wheels for receiving a drive of said engine through a differential device;
   right and left steerable wheels for receiving said drive of said engine through a second differential device;
   steering means for controlling said right and left steerable wheels;
   change speed means connected to said steerable wheels, said change speed means including a standard transmission mode for driving said right and left steerable wheels at substantially the same average peripheral velocity as said right and left non-steerable wheels, an accelerating transmission mode for driving said right and left steerable wheels at a greater average peripheral velocity than said right and left non-steerable wheels, and switching means for selecting between said standard transmission mode and said accelerating transmission mode; and
   interlocking means for interlocking said steering means and said switching means such that said change speed means is operable in said accelerating transmission mode when said steerable wheels are steered in excess of a predetermined angle,
   wherein an inner one of said steerable wheels with respect to a turning circle has a maximum steering angle $\beta 1$, and an outer one of said steerable wheels with respect to a turning circle has a maximum steering angle $\beta 2$ wherein $\beta 1 > \beta 2$, and $\beta 1$ and $\beta 2$ have an average $\beta$ wherein $$\text{secant } \beta \text{ is approximately equal to K}$$

where K is a ratio of said greater average peripheral velocity with respect to said average peripheral velocity, wherein $\beta 1$ is within the range of 63 to 65 degrees and K is approximately 2 wherein $\beta 1$ is set less than a theoretical maximum steering angle $\beta 01$ of said inner wheel for an ideal turn and $\beta 2$ is set greater than a theoretical maximum steering angle $\beta 02$ of said outer wheel for said ideal turn, wherein said theoretical maximum steering angle $\beta 02$ is derived from the following equation:

$$\beta 02 = \alpha + \gamma 2$$

where $$\tan \gamma 2 = \frac{(W/2) \sin \alpha}{(L/\sin \alpha) + ((W/2) \cos \alpha)}$$

where W is the tread of the right and left steerable wheels, L is a wheelbase of said vehicle, and $\alpha$ is an angle formed at the mid-point between said right and left steerable wheels formed between the moving direction of said vehicle and the centerline of said vehicle during said ideal turn, and wherein said theoretical maximum steering angle $\beta 01$ is derived from the following equation:

$$\beta 01 = \alpha + \gamma 1$$

where $$\tan \gamma 1 = \frac{(W/2) \sin \alpha}{(L/\sin \alpha) - ((W/2) \cos \alpha)}.$$

* * * * *